(12) United States Patent
Huang et al.

(10) Patent No.: US 12,240,344 B2
(45) Date of Patent: Mar. 4, 2025

(54) CABLE ASSEMBLY AND VEHICLE CHARGING SYSTEM

(71) Applicant: BYD COMPANY LIMITED, Guangdong (CN)

(72) Inventors: Bingjian Huang, Shenzhen (CN); Hao Lv, Shenzhen (CN); Hongbin Luo, Shenzhen (CN); Guangming Yang, Shenzhen (CN); Xinxin Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 590 days.

(21) Appl. No.: 17/629,931

(22) PCT Filed: Jul. 30, 2020

(86) PCT No.: PCT/CN2020/105883
§ 371 (c)(1),
(2) Date: Jan. 25, 2022

(87) PCT Pub. No.: WO2021/018254
PCT Pub. Date: Feb. 4, 2021

(65) Prior Publication Data
US 2022/0289051 A1    Sep. 15, 2022

(30) Foreign Application Priority Data
Jul. 31, 2019   (CN) .......................... 201910703492.3

(51) Int. Cl.
*H02J 7/00*      (2006.01)
*B60L 53/16*     (2019.01)
(Continued)

(52) U.S. Cl.
CPC ............... *B60L 53/18* (2019.02); *B60L 53/16* (2019.02); *H01R 13/642* (2013.01);
(Continued)

(58) Field of Classification Search
USPC ......................................... 320/109
See application file for complete search history.

(56) References Cited

U.S. PATENT DOCUMENTS

2015/0253830 A1* 9/2015 Montero ............... H02J 7/0068
                                                    713/340
2018/0086212 A1   3/2018 Dudar et al.
2019/0217732 A1   7/2019 Zhou et al.

FOREIGN PATENT DOCUMENTS

CN    104201736 A    12/2014
CN    107492773 A    12/2017
(Continued)

OTHER PUBLICATIONS

Jampeethong et al., "An EV quick charger based on CHAdeMO standard with grid-support function", 2015 18th International Conference on Electrical Machines and Systems (ICEMS), IEEE, XP0328513, Oct. 25, 2015, pp. 531-536.
(Continued)

*Primary Examiner* — Samuel Berhanu

(57) ABSTRACT

The present disclosure relates to the technical field of vehicles, and provides a cable assembly and a vehicle charging system. The cable assembly includes: a power supply plug, adapted to a discharging outlet of a discharging vehicle; a charging plug, adapted to a charging outlet of a to-be-charged vehicle; and a cable, connected between the power supply plug and the charging plug.

18 Claims, 4 Drawing Sheets

(51) Int. Cl.
*B60L 53/18* (2019.01)
*H01R 13/642* (2006.01)
*H01R 13/66* (2006.01)
*H01R 13/70* (2006.01)
*H01R 24/30* (2011.01)
*H02J 7/34* (2006.01)
*H01R 107/00* (2006.01)

(52) U.S. Cl.
CPC ......... *H01R 13/6616* (2013.01); *H01R 13/70* (2013.01); *H01R 24/30* (2013.01); *H02J 7/00045* (2020.01); *H02J 7/0045* (2013.01); *H02J 7/0068* (2013.01); *H02J 7/342* (2020.01); *H01R 2107/00* (2013.01); *H01R 2201/26* (2013.01)

(56) References Cited

FOREIGN PATENT DOCUMENTS

| CN | 207165869 U | 3/2018 |
| CN | 108177553 A | 6/2018 |
| CN | 208478786 U | 2/2019 |
| CN | 208767815 U | 4/2019 |

OTHER PUBLICATIONS

Mennekes. "Infrastructure components for electric mobility", Jan. 3, 2012, XP055149340, 20 pages, retrieved from URL: https://www.scribd.com/doc/77008131/Mennekes-EV-Solutions-1.
International Search Report and Written Opinion for Application No. PCT/CN2020/105883, mailed on Oct. 26, 2020, 8 pages.

* cited by examiner

CABLE ASSEMBLY AND VEHICLE CHARGING SYSTEM

CROSS-REFERENCE TO RELATED APPLICATIONS

This application is a National Phase Application of International Patent Application No. PCT/CN2020/105883, filed on Jul. 30, 2020, which is based on and claims priority to and benefits of Chinese Patent Application 201910703492.3, filed on Jul. 31, 2019 and entitled "CABLE ASSEMBLY AND VEHICLE CHARGING SYSTEM". The entire content of all of the above identified applications is incorporated herein by reference.

FIELD

The present disclosure relates to the technical field of vehicles, and in particular, to a cable assembly and a vehicle charging system.

BACKGROUND

With the development of the electric vehicle industry, a fast charging technology has become a key technology for electric vehicles. A dedicated direct current (DC) charging station (charging cabinet) can achieve quick charging for batteries of the electric vehicles, and a connection mode thereof is shown in FIG. 1. However, the DC charging stations are generally fixed and immovable and have a limited quantity, and therefore cannot satisfy charging requirements of the electric vehicles.

SUMMARY

An objective of the present disclosure is to at least resolve one of the technical problems in the related art to some extent.

To this end, the present disclosure is intended to provide a cable assembly. The cable assembly can achieve vehicle to vehicle (V2V) DC charging and has desirable generalization performance.

The present disclosure is further intended to provide a vehicle charging system.

In order to achieve the above objectives, an embodiment of a first aspect of the present disclosure provides a cable assembly. The cable assembly includes: a power supply plug, adapted to a discharging outlet of a discharging vehicle; a charging plug, adapted to a charging outlet of a to-be-charged vehicle; and a cable, connected between the power supply plug and the charging plug.

According to the cable assembly in this embodiment of the present disclosure, the power supply plug and the charging plug are directly connected to the corresponding vehicle outlets and are removable connection devices, can achieve V2V DC charging, and have more desirable generalization performance compared with charging by using a charging cabinet.

In order to achieve the above objectives, a second aspect of the present disclosure provides a vehicle charging system. The vehicle charging system includes: the cable assembly in the above embodiment; a discharging vehicle, where a discharging outlet is disposed on the discharging vehicle; a to-be-charged vehicle, where a charging outlet is disposed on the to-be-charged vehicle. When the discharging vehicle charges the to-be-charged vehicle, the discharging outlet is adaptively connected to the power supply plug, and the charging outlet is adaptively connected to the charging plug.

The vehicle charging system in this embodiment of the present disclosure realizes the charging and discharging connection between the discharging vehicle and the to-be-charged vehicle by using cable assembly, can realize V2V DC charging, and has more desirable generalization performance compared with charging connection with a charging cabinet.

The additional aspects and advantages of the present disclosure will be provided in the following description, some of which will become apparent from the following description or may be learned from practices of the present disclosure.

DETAILED DESCRIPTION

Figure 1:
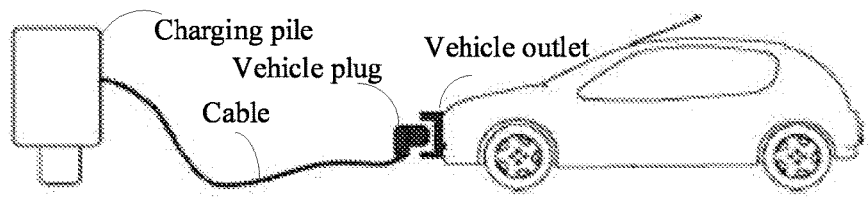
FIG. 1 is a schematic structural diagram of a cable assembly in the related art.

The following describes embodiments of the present disclosure in detail. Examples of the embodiments are shown in the accompanying drawings, and same or similar reference numerals in all the accompanying drawings indicate same or similar components or components having same or similar functions. The embodiments described below with reference to the accompanying drawings are exemplary, aiming to explain the present disclosure, but cannot be understood as a limitation on the present disclosure.

A cable assembly and a vehicle charging system in the embodiments of the present disclosure are described below with reference to the drawings.

Figure 2:
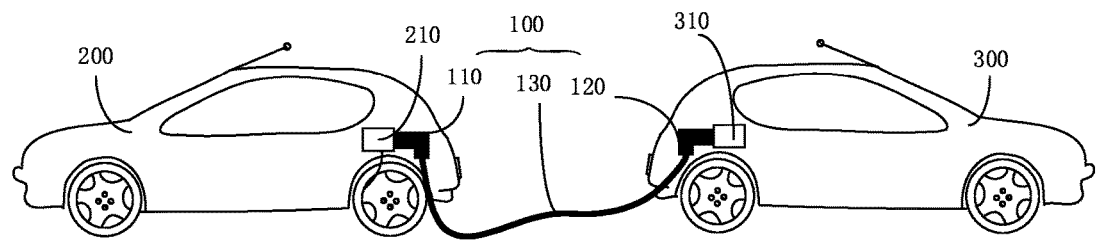
FIG. 2 is a schematic structural diagram of a cable assembly according to an embodiment of the present disclosure.

FIG. 2 is a schematic structural diagram of a cable assembly according to an embodiment of the present disclosure.

As shown in FIG. 2, a cable assembly 100 includes a power supply plug 110, a charging plug 120, and a cable 130. The power supply plug 110 is adapted to a discharging outlet 210 of a discharging vehicle 200, and the charging plug 120 is adapted to a charging outlet 310 of a to-be-charged vehicle 300. The cable 130 is connected between the power supply plug 110 and the charging plug 120.

Therefore, when the to-be-charged vehicle 300 is required to be charged, only the power supply plug 110 is required to be adaptively connected to the discharging outlet 210 of the discharging vehicle 200 and the charging plug 120 is required to be adaptively connected to the charging outlet 310 of the to-be-charged vehicle 300. In this way, electric energy can be transmitted from the discharging vehicle 200 to the to-be-charged vehicle 300 through the cable 130. That is to say, the charging of the to-be-charged vehicle 300 by the discharging vehicle 200 is realized. The operation is simple and easy.

Figure 3:
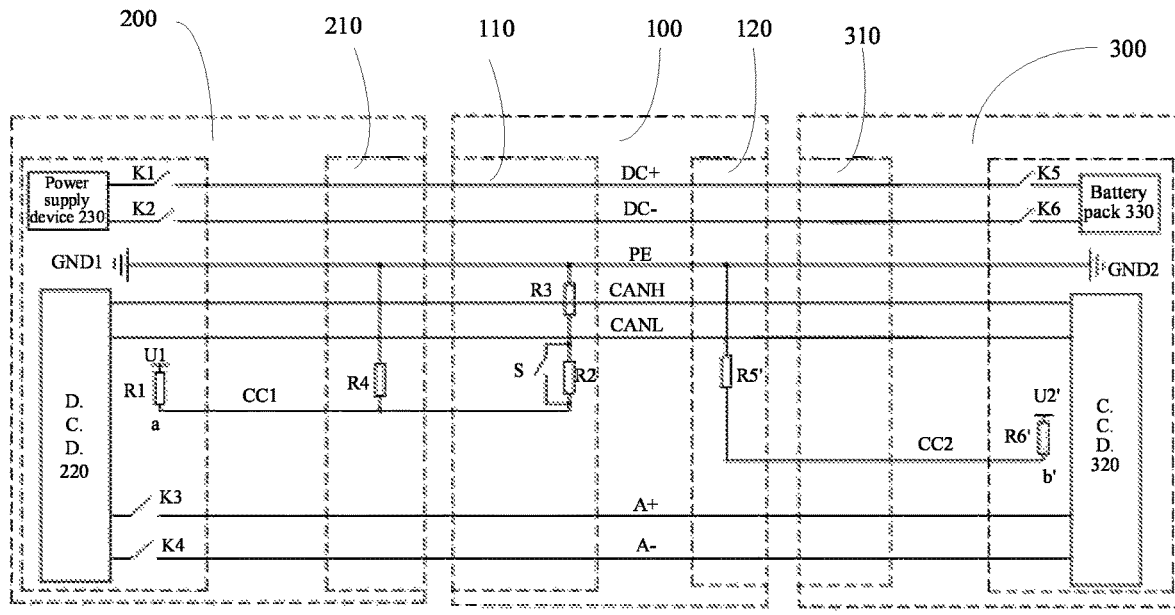
FIG. 3 is a circuit diagram of a cable assembly according to an embodiment of the present disclosure.
Figure 4:
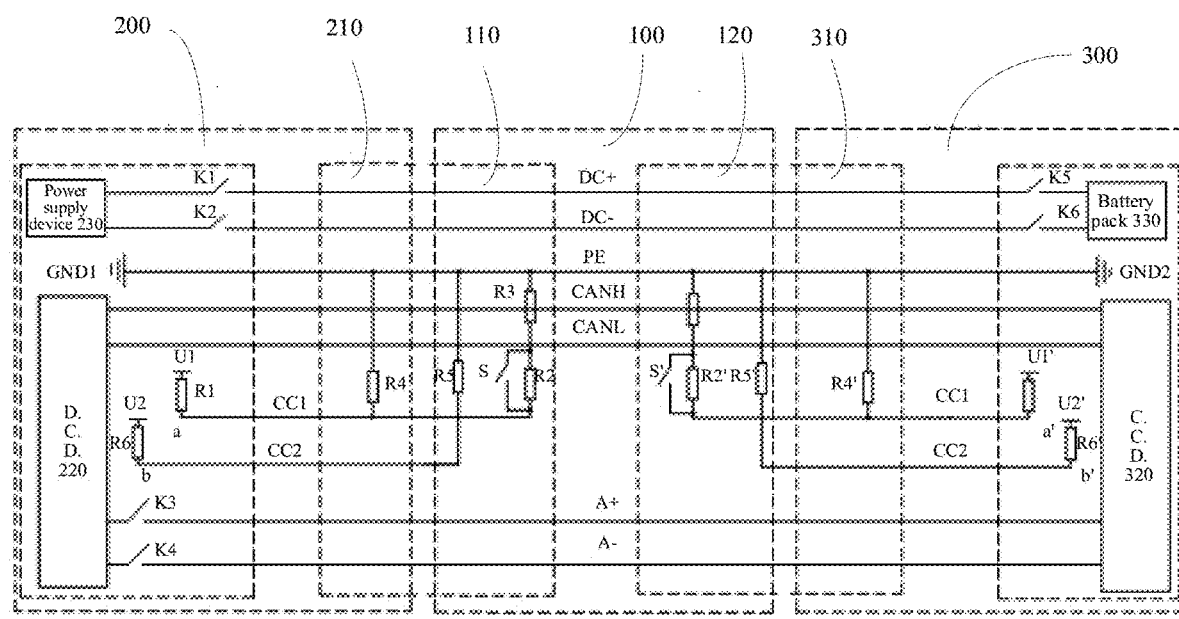
FIG. 4 is a circuit diagram of a cable assembly according to another embodiment of the present disclosure.

In some embodiments of the present disclosure, as shown in FIG. 3 and FIG. 4, the cable 130 is composed of a connecting harness. The connecting harness includes a DC+ line, a DC− line, a PE line, a CANH line, a CANL line, an A+ line, and an A− line.

In an embodiment, as shown in FIG. 3, the power supply plug 110 and the charging plug 120 each include 8 pins. The power supply plug 110 includes a DC+ pin, a DC− pin, a PE pin, a CANH pin, a CANL pin, an A+ pin, an A− pin, and a CC1 pin. The charging plug 120 includes a DC+ pin, a DC− pin, a PE pin, a CANH pin, a CANL pin, an A+ pin, an A− pin, and a CC2 pin. The DC+ pin, the DC− pin, the PE pin, the CANH pin, the CANL pin, the A+ pin, and the A− pin of each of the power supply plug 110 and the charging plug 120 are respectively and correspondingly connected to the DC+ line, the DC− line, the PE line, the CANH line, the CANL line, the A+ line, and the A− line. In other words, the power supply plug 110 and the charging plug 120 each have 8 pins disposed thereon, and 7 of the pins are the same, and are respectively and correspondingly connected to the 7 lines of the connecting harness of the cable 130. The only difference lies in the one different pin.

In this embodiment, as shown in FIG. 3, the power supply plug 110 includes a resistor R2, a resistor R3, and a switch S. One end of the resistor R3 is connected to the PE pin of the power supply plug 110, another end of the resistor R3 is connected to one end of the resistor R2, and another end of the resistor R2 is connected to the CC1 pin of the power supply plug 110. The switch S is connected in parallel to the resistor R2. The charging plug 120 includes a resistor R5'. One end of the resistor R5' is connected to the PE pin of the charging plug 120, and another end of the resistor R5' is connected to the CC2 pin of the charging plug 120.

Therefore, during vehicle charging and discharging, the power supply plug 110 and the charging plug 120 cannot be transposed. That is to say, in order to realize the charging of the to-be-charged vehicle 300 by the discharging vehicle 200, the power supply plug 110 is allowed to be connected to only the discharging outlet 210, and the charging plug 120 is allowed to be connected to only the charging outlet 310. In this embodiment, the configurations of the pins of the power supply plug 110 and the charging plug 120 are different. In order to further avoid connection errors, a power supply identifier may be disposed on the power supply plug 110, and/or a charging identifier may be disposed on the charging plug 120. That is to say, appearances of the power supply plug 110 and/or the charging plug 120 are marked differently obviously, for example, by using identifiers of different colors, different texts, or the like.

In another embodiment, as shown in FIG. 4, the power supply plug 110 and the charging plug 120 have a same structure. The power supply plug 110 and the charging plug 120 each include 9 pins: a DC+ pin, a DC− pin, a PE pin, a CANH pin, a CANL pin, an A+ pin, an A− pin, a CC1 pin, and a CC2 pin. The DC+ pin, the DC− pin, the PE pin, the CANH pin, the CANL pin, the A+ pin, and the A− pin are respectively and correspondingly connected to the DC+ line, the DC− line, the PE line, the CANH line, the CANL line, the A+ line and the A− line. In other words, the power supply plug 110 and the charging plug 120 each have 9 pins disposed thereon, and the 9 pins are the same. 7 of the pins are respectively and correspondingly connected to the 7 lines of the connecting harness of the cable 130.

In this embodiment, referring to FIG. 4, the power supply plug 110 includes a resistor R2, a resistor R3, a switch S, and a resistor R5. One end of the resistor R3 is connected to the PE pin of the power supply plug 110, another end of the resistor R3 is connected to one end of the resistor R2, and another end of the resistor R2 is connected to the CC1 pin of the power supply plug. The switch S is connected in parallel to the resistor R2. One end of the resistor R5 is connected to the PE pin of the power supply plug 110, and another end of the resistor R5 is connected to the CC2 pin of the power supply plug 110. The charging plug 120 includes a resistor R2', a resistor R3', a switch S', and a resistor R5'. Connection modes thereof are same as the connection modes of the components of the power supply plug 110.

Thus, during vehicle charging and discharging, the power supply plug 110 and the charging plug 120 can be transposed. That is to say, the power supply plug 110 may be connected to the discharging outlet 210 or the charging outlet 310. The same is true for the charging plug 120. In this way, connection errors can be avoided.

In this embodiment of the present disclosure, when the pin of the power supply plug 110 is inserted into the discharging outlet 210 or removed from the discharging outlet 210, the switch S may be opened by manual operation. For example, a button may be disposed on the power supply plug 110. When the button is pressed, the switch S is opened. At this time, the pins of the power supply plug 110 may be inserted into the discharging outlet 210, or the pins of the power supply plug 110 may be removed from the discharging outlet 210. When the pins of the power supply plug 110 are inserted into the discharging outlet 210, the button is released to close the switch S.

In this embodiment of the present disclosure, the discharging outlet 210 and the charging outlet 310 each include a DC+ jack, a DC− jack, a PE jack, a CANH jack, a CANL jack, an A+ jack, an A− jack, a CC1 jack, and a CC2 jack.

In an embodiment, referring to FIG. 3, when the power supply plug 110 and the charging plug 120 each include 8 pins, the DC+ jack, the DC− jack, the PE jack, the CANH jack, the CANL jack, the A+ jack, the A− jack, and the CC1 jack of the discharging outlet 210 are respectively and correspondingly connected to the DC+ pin, the DC− plug, the PE pin, the CANH pin, the CANL pin, the A+ pin, the A− pin, and the CC1 pin of the power supply plug 110, and the CC2 jack of the discharging outlet 210 is idle. The DC+ jack, the DC− jack, the PE jack, the CANH jack, the CANL jack, the A+ jack, the A− jack, and the CC2 jack of the charging outlet 310 are respectively and correspondingly connected to the DC+ pin, the DC− plug, the PE pin, the CANH pin, the CANL pin, the A+ pin, the A− pin, and the CC2 pin of the charging plug 120, and the CC1 jack of the charging outlet 310 is idle.

In another embodiment, referring to FIG. 4, when the power supply plug 110 and the charging plug 120 each include 9 pins, the DC+ jack, the DC− jack, the PE jack, the CANH jack, the CANL jack, the A+ jack, the A− jack, the CC1 jack, and the CC2 jack of the discharging outlet 210 are respectively and correspondingly connected to the DC+ pin, the DC− pin, the PE pin, the CANH pin, the CANL pin, the A+ pin, the A− pin, the CC1 pin, and the CC2 pin of the power supply plug 110. The DC+ jack, the DC− jack, the PE jack, the CANH jack, the CANL jack, the A+ jack, the A− jack, the CC1 jack, and the CC2 jack of the charging outlet 310 are respectively and correspondingly connected to the DC+ pin, the DC− pin, the PE pin, the CANH pin, the CANL pin, the A+ pin, the A− pin, the CC1 pin, and the CC2 pin of the charging plug 120.

Referring to FIG. 3 and FIG. 4, the discharging outlet 210 includes a resistor R4. One end of the resistor R4 is connected to the PE jack of the discharging outlet 210, and another end of the resistor R4 is connected to the CC1 jack of the discharging outlet. The discharging vehicle 200 includes a power supply device 230, a discharging control device 220, a resistor R1, a resistor R6, a switch K1, a switch K2, a switch K3, a switch K4, and a first body ground GND1. A first electrode of the power supply device 230 is connected to the DC+ jack of the discharging outlet 210 by the switch K1. A second electrode of the power supply device 230 is connected to the DC− jack of the discharging outlet 210 by the switch K2. The first body ground GND1 is connected to the PE jack of the discharging outlet 210. The discharging control device 220 is connected to the CANH jack and the CANL jack of the discharging outlet 210 to transmit charging and discharging data. A first electrode of an auxiliary power supply in the discharging control device 220 is connected to the A+ jack of the discharging outlet 210 by the switch K3. A second electrode of the auxiliary power supply is connected to the A− jack of the discharging outlet 210 by the switch K4. One end of the resistor R1 is connected to the CC1 jack of the discharging outlet 210 to form a first detection point a. Another end of the resistor R1 is connected to a first pull-up voltage U1. One end of the resistor R6 is connected to the CC2 jack of the discharging outlet 210 to form a second detection point b. Another end of the resistor R6 is connected to a second pull-up voltage U2.

Referring to FIG. 3 and FIG. 4, the charging outlet 310 includes a resistor R4'. One end of the resistor R4' is connected to the PE jack of the charging outlet 310, and another end of the resistor R4' is connected to the CC1 jack of the charging outlet 310. The to-be-charged vehicle 300 includes a battery pack 330, a charging control device 320, a resistor R1', a resistor R6', a switch K5, a switch K6, and a second body ground GND2. A first electrode of the battery pack 330 is connected to the DC+ jack of the charging outlet 310 by the switch K5. A second electrode of the battery pack 330 is connected to the DC− jack of the charging outlet by the switch K6. The second body ground GND2 is connected to the PE jack of the charging outlet 310. The charging control device 320 is connected to the CANH jack and the CANL jack of the charging outlet 310 to transmit charging and discharging data. A positive power supply terminal of the charging control device 320 is connected to the A+ jack of the charging outlet 310. A negative power supply terminal of the charging control device 320 is connected to the A− jack of the charging outlet 310. One end of the resistor R1' is connected to the CC1 jack of the charging outlet 310 to form a third detection point a'. Another end of the resistor R1' is connected to a third pull-up voltage U1'. One end of the resistor R6' is connected to the CC2 jack of the charging outlet 310 to form a fourth detection point b'. Another end of the resistor R6' is connected to a fourth pull-up voltage U2'.

It should be noted that, in the embodiment shown in FIG. 3, the CC2 jack of the discharging outlet 210 and the CC1 jack of the charging outlet 310 are idle. Therefore, the resistor R6 of the discharging vehicle 200 and the resistors R4' and R1' of the to-be-charged vehicle 300 are not shown in FIG. 3.

In an embodiment of the present disclosure, the four pull-up voltages U1, U2, U1', and U2' are equal, for example, are all U.

The discharging control device 220 is configured to determine that the power supply plug 110 is electrically connected to the discharging outlet 210 when a decrease value of a voltage of the first detection point a is greater than a first preset value. The charging control device 320 is configured to determine that the charging plug 120 is electrically connected to the charging outlet 310 when a decrease value of a voltage of the fourth detection point b' is greater than a second preset value.

Specifically, referring to FIG. 3 and FIG. 4, when the switch S is opened and the pins of the power supply plug 110 are not inserted into the discharging outlet 210, the pull-up voltage U1 supplies power to only the resistors R1 and R4 connected in series, and the voltage of the first detection point a is relatively large. When the switch S is opened and the pins of the power supply plug 110 are inserted into the discharging outlet 210, the pull-up voltage U1 supplies power to the resistors R1, R4, R2, and R3. R2 and R3 connected in series are connected in parallel to R4 and then connected in series to R1. The voltage of the first detection point a is reduced. When the switch S is closed and the pins of the power supply plug 110 are inserted into the discharging outlet 210, the pull-up voltage U1 supplies power to the resistors R1, R4, and R3. R3 is connected in parallel to R4 and then connected in series to R1. The voltage of the first detection point a is further reduced. Therefore, based on the settings of the resistors R2 and R3 and the switch S, the status of the connection between the power supply plug 110 and the discharging outlet 210 may be accurately determined by using the voltage value of the first detection point a.

It should be understood that the power supply device 230 corresponds to the battery pack 330, the switches K1 and K2 correspond to the switches K5 and K6, the resistors R1 and R6 correspond to the resistors R1' and R6', and the discharging control device 220 corresponds to the charging control device 320. It should be noted that two switches corresponding to the switches K3 and K4 are further required to be disposed in the to-be-charged vehicle 300. When the discharging control device 220 determines that the power supply plug 110 is completely inserted into the discharging outlet 210, that is, the power supply plug 110 is completely connected to the discharging outlet 210, the control switches K3 and K4 are closed.

In this embodiment of the present disclosure, during charging of the to-be-charged vehicle 300, if the charging control device 320 of the to-be-charged vehicle 300 does not require power supply from an auxiliary power supply, the switches K3 and K4 may not be disposed in the discharging vehicle 200.

In an embodiment of the present disclosure, a bleeder circuit and an insulation detection circuit are further disposed on each of the discharging vehicle 200 and the to-be-charged vehicle 300. For example, in the discharging vehicle 200, one end of the bleeder circuit is connected to a line connecting the switch K1 to the power supply device 230, and another end of the bleeder circuit is connected to a line connecting the switch K2 to the power supply device 230. A first end of the insulation detection circuit is connected to the line connecting the switch K1 to the power supply device 230, a second end of the insulation detection circuit is connected to the line connecting the switch K2 to the power supply device 230, and a third end of the insulation detection circuit is connected to the first body ground GND1. In addition, the bleeder circuit and the insulation detection circuit each have a switching function.

The charging of the to-be-charged vehicle 300 by the discharging vehicle 200 in the embodiment shown in FIG. 4 is described below with reference to Table 1, Table 2, Table 3, and FIG. 5. Table 1 shows parameters such as resistances and voltages in FIG. 4.

TABLE 1

| Object | Parameter | Symbol | Unit | Nominal value |
|---|---|---|---|---|
| Discharging vehicle 200 | Equivalent resistance of R1 | R1 | Ω | 1000 |
| | Equivalent resistance of R6 | R6 | Ω | 1000 |
| | Pull-up voltage | U | V | 5 |
| | Voltage of first detection point a | U1a | V | 2.5 |
| | | U1b | V | 2.1 |
| | | U1c | V | 1.7/1.3/0.9/0.5 V |
| Discharging outlet | Equivalent resistance of R4 | R4 | Ω | 1000 |
| Power supply plug | Equivalent resistance of R5 | R5 | Ω | 1000 |
| Charging plug | Equivalent resistance of R5' | R5' | Ω | 1000 |
| Charging outlet | Equivalent resistance of R4' | R4' | Ω | 1000 |
| To-be-charged vehicle 300 | Equivalent resistance of R1' | R1' | Ω | 1000 |
| | Equivalent resistance of R6' | R6' | Ω | 1000 |
| | Pull-up voltage | U | V | 5 |
| | Voltage of fourth detection point b' | U2a | V | 5 |
| | | U2b | V | 2.5 |

Charging Control Process:

1) The Connecting Component is Inserted into the Vehicle Outlet, so that the Vehicle in a Travel-Forbidden State As shown in FIG. 4, the switch S of the power supply plug 110 is pressed to open the switch S, and the power supply plug 110 is inserted into the discharging outlet 210 of the discharging vehicle 200. After the insertion is completed, the switch S of the power supply plug 110 is released to restore the switch S to a normal close state, so that the power supply plug 110 is completely connected to the discharging outlet 210. The charging plug 120 is inserted into the charging outlet 310 of the to-be-charged vehicle 300 in the same way according to the above operations.

During the insertion of the power supply plug 110 into the discharging outlet 210, a change in the voltage of the first detection point a of the discharging vehicle 200 is as follows: 2.5 V→2.1 V→1.7 V/1.3 V/0.9 V/0.5 V. 2.5 V represents that the power supply plug 110 is not connected to the discharging outlet 210. 2.1 V represents that the power supply plug 110 is half connected to the discharging outlet 210. 1.7 V/1.3 V/0.9 V/0.5 V represents that the power supply plug 110 is completely connected to the discharging outlet 210. During the insertion of the charging plug 120 into the charging outlet 310, a change in the voltage of the fourth detection point b' of the to-be-charged vehicle 300 is as follows: 5 V→2.5 V.

It should be noted that, during the insertion of the connecting component into the outlet, turn-on of the switch S may be used as a trigger condition. Therefore, when the switch S is turned on, the vehicle is caused to enter a travel-forbidden state through interlocking or other control measures. In an embodiment, the trigger condition may be opening a charging and discharging outlet cover, connecting an adapter component to the vehicle outlet, and operating a charging and discharge button/switch of the vehicle.

2) Confirmation of Vehicle Interface Connection

After an operator sets the discharging vehicle 200 for charging, the discharging control device 220 of the discharging vehicle 200 determines whether the power supply plug 110 is completely connected to the discharging outlet 210 by measuring the voltage value of the first detection point a. If the voltage value of the first detection point a is one of 1.7 V/1.3 V/0.9 V/0.5 V, it is determined that the power supply plug 110 is completely connected to the discharging outlet 210.

3) Self-Inspection of the Discharging Vehicle

After the power supply plug 110 is completely connected to the discharging outlet 210, the switches K3 and K4 are closed so that a low-voltage auxiliary power supply loop is connected. The switches K1 and K2 are closed to perform insulation detection. An output voltage during the insulation detection is a smaller value of an insulation voltage in a vehicle communication handshake message and a rated voltage of the power supply device 230. After the insulation detection is completed, the insulation detection circuit is physically separated from the power supply loop, and the bleeder circuit is enabled to discharge a charging output voltage. After the discharging vehicle 200 completes the self-check, K1 and K2 are opened, and the communication handshake message is periodically transmitted. If the to-be-charged vehicle 300 requires the discharging vehicle 200 to provide an auxiliary power supply 240, after the auxiliary power supply 240 provided by the discharging vehicle 200 is obtained, the charging control device 320 of the to-be-charged vehicle 300 determines whether the charging plug 120 is completely connected to the charging outlet 310 by measuring the voltage value of the fourth detection point b'. If the to-be-charged vehicle 300 does not require the discharging vehicle 200 to provide an auxiliary voltage, the charging control device 320 directly measures the voltage value of the fourth detection point b' to determine whether the charging plug 120 is connected to the charging outlet 310. If the voltage value of the fourth detection point b' is 2.5 V, the charging control device 320 of the to-be-charged vehicle 300 starts to periodically transmit the communication handshake message.

4) Ready to Charge

In a configuration phase of the charging control device 320 and the discharging control device 220, the charging control device 320 controls the switches K5 and K6 to be closed, so that the charging loop is connected. After the discharging control device 220 detects that a voltage of the battery pack 330 of the to-be-charged vehicle 300 is normal (that is, determines that the voltage of the battery pack is greater than a minimum output voltage of the power supply device 230 and less than a maximum output voltage of the power supply device 230), the discharging control device controls the switches K1 and K2 to be closed, so that the DC power supply loop is connected.

5) Charging Phase

In the charging phase, the charging control device 320 transmits a battery charging requirement parameter to the discharging control device 220 in real time. When a charging current decreases such that $\Delta I \leq 20$ A, the charging control adjusts the charging current to be same as a command value within a longest time of 1 s. When a charging current decreases such that $\Delta I > 20$ A, the charging control adjusts the charging current to be same as the command value within $\Delta I/dlmin$ s (dlmin is a minimum charging rate, which is 20 A/s). The discharging control device 220 adjusts the charging voltage and the charging current in real time according to the battery charging demand parameter. In addition, the charging control device 320 and the discharging control device 220 further transmit respective status information to each other. During the charging, the charging control device 320 is required to be able to detect disconnection of the PE pin.

6) Ending of Charging Under Normal Conditions

The charging control device 320 determines whether to end the charging according to whether a battery system reaches a fully charged state or whether a message instructing to end charging by the discharging vehicle. When any of the above charging ending conditions is met, the charging control device 320 starts to periodically transmit a message instructing to end charging by the charging control device (or a battery management system), and opens the switches K5 and K6 after it is determined that the charging current is less than 5 A. When the charging ending condition set by the operator is met or the message instructing to end charging by the charging control device (or the battery management system) is received, the discharging control device 220 periodically transmits the message instructing to end charging by the discharging vehicle and controls the discharging vehicle 200 to stop charging and reduce the charging current at a rate not less than 100 A/s. When the charging current is less than or equal to 5 A, the switches K1 and K2 are opened. When the operator implements the charging ending instruction, the discharging control device 220 starts to periodically transmit the message instructing to end charging by the discharging vehicle, and controls the discharging vehicle 200 to stop charging. When it is determined that the charging current is less than 5 A, the switches K1 and K2 are opened, the bleeder circuit is enabled again, and then the switches K3 and K4 are opened.

7) Ending of Charging Under Abnormal Conditions

During the charging, if the discharging vehicle 200 fails to continue to perform charging, the message instructing to end charging by the discharging vehicle is periodically transmitted to the to-be-charged vehicle 300, and the discharging vehicle is controlled to stop charging. The current value is required to be reduced to 5 A within 50 ms or the switches K1, K2, K3 and K4 are required to be opened within 100 ms.

During the charging, if the to-be-charged vehicle 300 fails to continue to be charged, a message instructing to end charging to the to-be-charged vehicle is transmitted to the discharging vehicle 200, and the switches K5 and K6 are opened within 300 ms.

During the charging, if the discharging control device 220 determines that the communication is interrupted, the discharging vehicle 200 stops charging and opens the switches K1, K2, K3, and K4.

During the charging, the discharging control device 220 detects the voltage of the first detection point a. If it is determined that the switch S of the power supply plug 110 is changed from close to open, the output current is required to be reduced to 5 A or less within 50 ms.

During the charging, the discharging control device 220 detects the voltage of the first detection point a. If it is determined that the power supply plug 110 and the discharging outlet 210 are changed from being completely connected to being disconnected, the discharging vehicle 200 is controlled to stop charging, and the switches K1, K2, K3, and K4 are opened.

During the charging, if the output voltage of the power supply device 230 is greater than a maximum total allowable charging voltage of the to-be-charged vehicle 300, the discharging vehicle 200 is controlled to stop charging.

Certainly, if the discharging vehicle 200 ends charging due to a serious fault, the charging is restarted, which requires the operator to perform a complete setting to restart the charging.

Principle of Charging Circuit

1) An insulation detection circuit is disposed in each of the discharging vehicle 200 and the to-be-charged vehicle 300. After the power supply plug 110 is inserted into the discharging outlet 210 and the charging plug 120 is inserted into the charging outlet 310 and before the switches K5 and K6 are closed for charging, the discharging vehicle 200 is responsible for insulation inspection of an interior of the discharging vehicle 200 (including insulation inspection of the charging cable). The insulation detection circuit of the discharging vehicle 200 is disconnected from the charging DC loop by using the switch. During the charging after the switches K5 and K6 are closed, the to-be-charged vehicle 300 is responsible for insulation inspection of the entire system. For insulation resistances between DC+ and PE and between DC– and PE of the charging DC circuit (a small value R of the two is used), when $R > 500 \Omega/V$, safety is determined. When $100 \Omega/V < R < 500 \Omega/V$, insulation abnormality alarming may be performed, but the charging can normally proceed. When $R < 100 \Omega/V$, an insulation failure is determined, and the charging is required to be stopped.

2) After the insulation detection of the discharging vehicle 200, the charging output voltage is required to be discharged in time to avoid voltage impact on a battery load in the charging phase. After the charging ends, the discharging vehicle 200 is required to discharge the charging output voltage in time to avoid electric damage to the operator. Parameters of the bleeder circuit are required to be selected in such a way that a voltage of a power supply interface decreases to be less than 60 VDC within 1 second after a charging connector is disconnected.

3) When the charging loop or the control loop loses power due to a power failure, the discharging vehicle 200 is required to open the switches K1 and K2 within 1 second or reduce the voltage of the charging interface to be less than 60 VDC within 1 second by using the bleeder circuit.

As described above, the discharging vehicle 200 may determine whether the power supply plug 110 is completely connected to the discharging outlet 210 by using a resistance value between the first detection point a and PE (the voltage value of the first detection point a) and the rated current parameter of the cable 130. For specific determination the connection status and the rated current parameter, refer to Table 2.

TABLE 2

| Status | R3 | R2 | S | U1 | Interface connection status and rated current |
|---|---|---|---|---|---|
| State A | — | | — | 2.5 V | The vehicle interface is not completely connected |
| State B | — | | Open | 2.5 V | The mechanical locking device is unlocked |
| State C | 1.1 KΩ/0.5 W$^a$ | — | Close | 1.7 V | The vehicle interface is completely connected, and the capacity of the charging cable is 80 A |
| State C' | 1.1 KΩ/0.5 W$^a$ | 1.5 KΩ/0.5 W$^b$ | Open | 2.1 V | The vehicle interface is in a half-connected state |
| State D | 560 Ω/0.5 W$^a$ | — | Close | 1.3 V | The vehicle interface is completely connected, and the capacity of the charging cable is 125 A. |
| State D' | 560 Ω/0.5 W$^a$ | 2 KΩ/0.5 W$^b$ | Open | 2.1 V | The vehicle interface is in a half-connected state |
| State E | 270 Ω/0.5 W$^a$ | — | Close | 0.9 V | The vehicle interface is completely connected, and the capacity of the charging cable is 200 A |
| State E' | 270 Ω/0.5 W$^a$ | 2.4 KΩ/0.5 W$^b$ | Open | 2.1 V | The vehicle interface is in a half-connected state |
| State F | 125 Ω/0.5 W$^a$ | — | Close | 0.5 V | The vehicle interface is completely connected, and the capacity of the charging cable is 250 A |
| State F' | 125 Ω/0.5 W$^a$ | 2.4 KΩ/0.5 W$^b$ | Open | 2.1 V | The vehicle interface is in a half-connected state |

In the half-connected state, the equivalent resistance is a resistance obtained after R2 and R3 are connected in series and then connected in parallel to R4 and then connected in series to R1. All detected voltages U1 are 2.1 V. In the complete connected state, the equivalent resistance is a resistance obtained after R3 and R4 are connected in parallel and then connected in series to R1. When the resistance values of the resistors R3 and R2 configured in the cable assembly 100 are different, the detected voltages U1 are different after different cable assemblies 100 are completely connected. The capacity of the charging cable is 80 A when U1 is 1.7 V, the capacity of the charging cable is 125 A when U1 is 1.3 V, the capacity of the charging cable is 200 A when U1 is 0.9 V, and the capacity of the charging cable is 250 A when U1 is 0.5 V.

Figure 5:
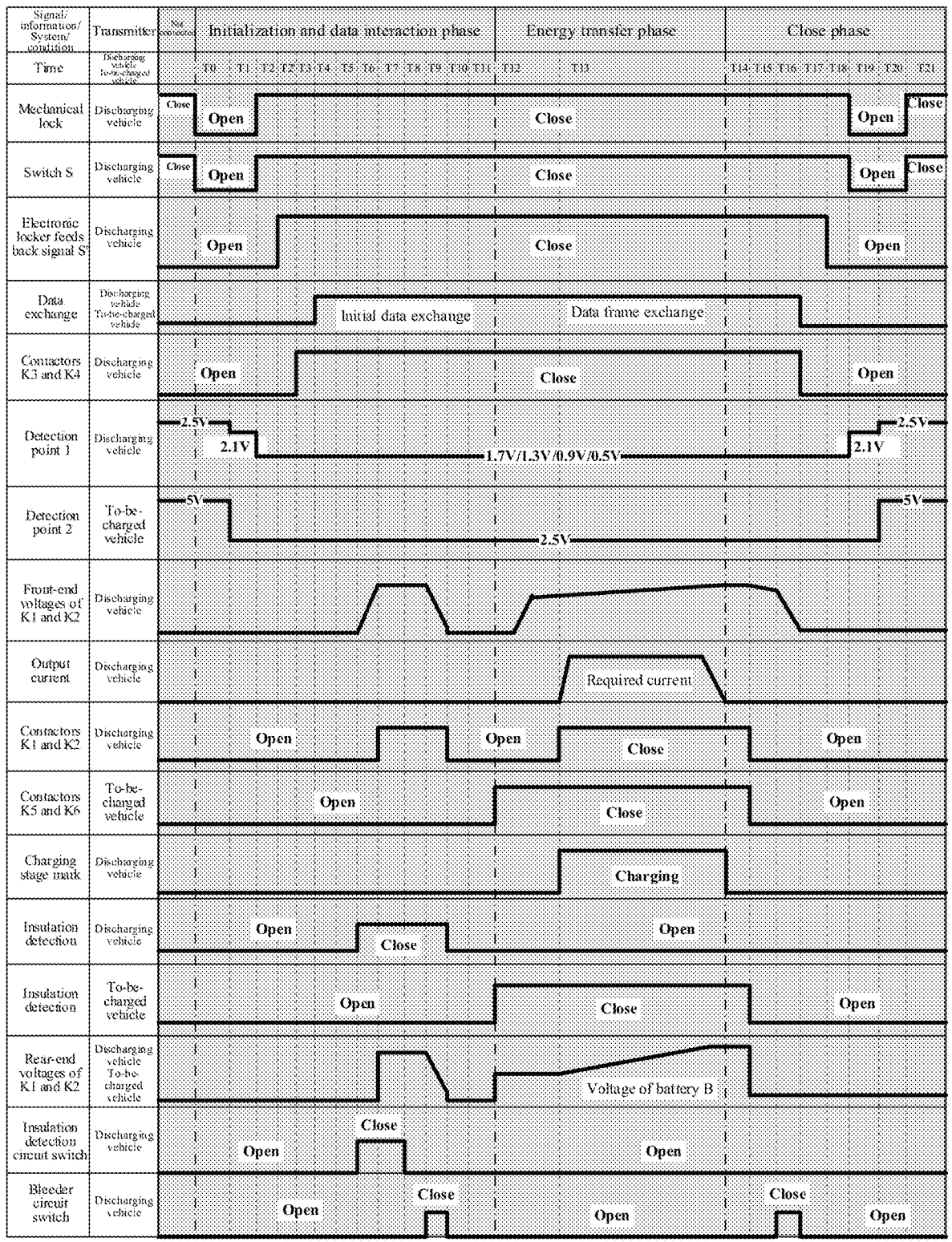
FIG. 5 is a timing diagram of charging control according to an embodiment of the present disclosure.

The above DC charging connection process and control timing are shown in FIG. 5, and description of the control timing is shown in Table 3:

TABLE 3

| | |
|---|---|
| T0 | When the vehicle interface is not connected, the protective switch S of the connecting component is pressed to open the switch S. |
| T1 | When the vehicle interface is not completely connected, the switch S is maintained in the open state, and the connecting component is inserted into the vehicle outlet. |
| T2 | After the connecting component is inserted into the vehicle outlet, the switch S is released so that the switch S normally closed. In this case, the vehicle interface is completely connected. |
| T2' | An electronic locker feeds back a reliable locking signal |
| T0->T2 | During the insertion of the connecting component into the vehicle outlet, the voltage of the first detection point a of the discharging vehicle changes as follows: 2.5 V->2.1 V->1.7 V/1.3 V/0.9 V/0.5 V, and the voltage of the fourth detection point b' of the to-be-charged vehicle changes as follows: 5 V->2.5 V. |
| T3 | The discharging vehicle closes the switches K3 and K4 so that the low-voltage auxiliary power supply loop is connected. |
| T4 | The discharging vehicle enables the handshake message. |
| T4->T5 | Initial data exchange is performed. The discharging vehicle acquires the maximum total allowable charging voltage and the rated current of the charging cable. After obtaining the low-voltage auxiliary power supply provided by the discharging vehicle, the charging control device determines whether the vehicle interface is fully connected by measuring the voltage value of the fourth detection point b'. If the voltage value of the fourth detection point b' is 2.5 V, the charging control device waits for the handshake message transmitted by the discharging vehicle, and periodically transmits a handshake message after receiving the handshake message transmitted by the discharging vehicle. |
| T6 | The discharging vehicle closes an insulation detection circuit switch and enables insulation monitoring. |
| T7 | The discharging vehicle closes the switches K1 and K2, and the output voltage is an insulation monitoring voltage. The insulation monitoring voltage is a smaller one of the maximum total allowable charging voltage and the rated voltage of the discharging vehicle. |

TABLE 3-continued

| | |
|---|---|
| T8 | The insulation detection ends, and the insulation detection circuit switch is opened. |
| T9 | A bleeder circuit switch is closed, and discharging is enabled. |
| T10 | After a residual voltage is discharged, the bleeder circuit is cut off, and a DC output contactor is cut off. |
| T6-T10 | After the discharging vehicle receives the maximum total allowable voltage of the to-be-charged vehicle, the discharging vehicle is responsible for the insulation inspection of the interior of the discharging vehicle (including the insulation inspection of the charging cable).<br>For insulation resistances between DC+ and PE and between DC− and PE of the charging DC circuit (a small value R of the two is used), when R > 500 Ω/V, safety is determined. When 100 Ω/V < R < 500 Ω/V, insulation abnormality alarming may be performed, but the charging can normally proceed. When R < 100 Ω/V, an insulation failure is determined, and the charging is required to be stopped. |
| T11 | The discharging vehicle starts to periodically transmit a communication identification message. The charging control device waits for the communication identification message transmitted by the discharging vehicle, and periodically transmits the identification message after receiving the identification message transmitted by the discharging vehicle. |
| T12 | The to-be-charged vehicle is ready for charging, and the charging control device closes the switches K5 and K6 so that the charging loop is connected. The to-be-charged vehicle is responsible for insulation inspection of the entire system. |
| T13 | The discharging control device detects that the battery voltage of the to-be-charged vehicle is normal (determines that the battery voltage is greater than the minimum output voltage of the discharging vehicle and less than the maximum output voltage of the discharging vehicle), and the discharging vehicle outputs a pre-charging voltage and then closes the switches K1 and K2 so that the DC power supply loop is connected.<br>In the charging phase, after the output voltage of the discharging vehicle reaches the battery voltage of the to-be-charged vehicle, the charging voltage and the charging current are adjusted according to the battery charging requirement transmitted by the to-be-charged vehicle in real time, and the charging status is exchanged with each other. |
| T12-T13 | The output voltage of the discharging vehicle is the pre-charging voltage, which is a current battery voltage minus 10 V. |
| T14 | When the charging ending condition is met, the charging control device starts to periodically transmit a message instructing to end charging by a battery management system, and the discharging vehicle periodically transmits a message instructing to end charging by the discharging vehicle, and controls the discharging vehicle to stop charging.<br>The discharging vehicle stops outputting, and the output current is 5 A or less. |
| T15 | The charging control device opens the switches K5 and K6. The discharging vehicle opens the switches K1 and K2.<br>The to-be-charged vehicle stops the insulation monitoring. |
| T16 | The discharging vehicle closes the circuit switch to discharge the output voltage, so as to avoid electric damage to the operator. |
| T17 | When the output voltage of the discharging vehicle decreases to be less than 60 V, the bleeder circuit switch is opened. The discharging vehicle opens the switches K3 and K4. The two parties stop communication and interaction. |
| T18 | The electronic locker feeds back an unlocking signal. |
| T19 | The switch S of the connecting component is pressed to open the switch S. |
| T20 | The switch S is maintained in the open state, and the connecting component is removed from the vehicle outlet. |
| T21 | When the connecting component is completely separated from the vehicle outlet, the switch S is released. |
| T19->T21 | During disconnection of the connecting component from the vehicle outlet, the voltage of the first detection point a of the discharging vehicle changes as follows: 0.4 V/0.9 V/1.3 V/1.7 V->2.1 V->2.5 V, and the voltage of the fourth detection point b' of the to-be-charged vehicle changes as follows: 2.5 V->5 V. |

It should be noted that when there is no charging appointment, T0-T7 in FIG. 5 is less than 10 minutes, and T5-T6 is less than 30 seconds. When there is a charging appointment, there is no time limit for T0-T7 and T5-T6. T4-T5 represents the initial data interaction, during which exchange of data such as a communication version and the maximum total allowable charging voltage is completed. K3 and K4 are required to be opened after the discharging vehicle 200 has transmitted a CSD message and received a BSD message of the battery management system (BMS). After the charging is completed, the bleeder circuit is required to be enabled after the switches K1, K2, K5, and K6 are opened and to exit when the residual voltage is less than 60 V. After a voltage of the CC1 jack changes from 2.1 V to 2.5 V, the bleeder circuit is required to remain cut off.

In addition, in this embodiment of the present disclosure, other two sets of data are available for the setting parameters of the cable assembly 100, as shown in Table 4 and Table 6. Determination of an interface connection status and a rated current parameter corresponding to Table 4 is shown in Table 5, and determination of an interface connection status and a rated current parameter corresponding to Table 6 is shown in Table 7.

TABLE 4

| Object | Parameter | Symbol | Unit | Nominal value |
|---|---|---|---|---|
| Discharging vehicle 200 | Equivalent resistance of R1 | R1 | Ω | 110 |
| | Equivalent resistance of R6 equivalent | R6 | Ω | 1000 |
| | First pull-up voltage | U1 | V | 5 |
| | Voltage of first detection point a | U1a | V | 4.5 |
| | | U1b | V | 4 |
| | | U1c | V | 3/2/1/0.5 |
| Discharging outlet | Equivalent resistance of R4 | R4 | Ω | 1000 |
| Power supply plug | Equivalent resistance of R5 | R5 | Ω | 1000 |
| Charging plug | Equivalent resistance of R5' | R5' | Ω | 1000 |
| Charging outlet | Equivalent resistance of R4' | R4' | Ω | 1000 |
| To-be-charged vehicle 300 | Equivalent resistance of R1' | R1' | Ω | 110 |
| | Equivalent resistance of R6' | R6' | Ω | 1000 |
| | Fourth pull-up voltage | U2' | V | 5 |
| | Voltage of fourth detection point b' | U2a | V | 5 |
| | | U2b | V | 2.5 |

TABLE 5

| Status | R3 | R2 | S | U1 | Interface connection status and rated current |
|---|---|---|---|---|---|
| State A | — | | — | 4.5 V | The vehicle interface is not completely connected |
| State B | — | | Open | 4.5 V | The mechanical locking device is unlocked |
| State C | 200 Ω/0.5 W$^a$ | — | Close | 3 V | The vehicle interface is completely connected, and the capacity of the charging cable is 80 A |
| State C' | 200 Ω/0.5 W$^a$ | 620 Ω/0.5 W$^b$ | Open | 4 V | The vehicle interface is in a half-connected state |
| State D | 82 Ω/0.5 W$^a$ | — | Close | 2 V | The vehicle interface is completely connected, and the capacity of the charging cable is 125 A |
| State D' | 82 Ω/0.5 W$^a$ | 750 Ω/0.5 W$^b$ | Open | 4 V | The vehicle interface is in a half-connected state |
| State E | 27 Ω/0.5 W$^a$ | — | Close | 1 V | The vehicle interface is completely connected, and the capacity of the charging cable is 200 A |
| State E' | 27 Ω/0.5 W$^a$ | 750 Ω/0.5 W$^b$ | Open | 4 V | The vehicle interface is in a half-connected state |
| State F | 12 Ω/0.5 W$^a$ | — | Close | 0.5 V | The vehicle interface is completely connected, and the capacity of the charging cable is 250 A |
| State F' | 12 Ω/0.5 W$^a$ | 750 Ω/0.5 W$^b$ | Open | 4 V | The vehicle interface is in a half-connected state |

TABLE 6

| Object | Parameter | Symbol | Unit | Nominal value |
|---|---|---|---|---|
| Discharging vehicle 200 | Equivalent resistance of R1 | R1 | Ω | 1000 |
| | Equivalent resistance of R6 | R6 | Ω | 1000 |
| | First pull-up voltage | U | V | 5 |
| | Voltage of first detection point a | U1a | V | 2.5 |
| | | U1b | V | 2 |
| | | U1c | V | 1.5/1.0/0.5 V |
| Discharging outlet | Equivalent resistance of R4 | R4 | Ω | 1000 |
| Power supply plug | Equivalent resistance of R5 | R5 | Ω | 1000 |
| Charging plug | Equivalent resistance of R5' | R5' | Ω | 1000 |
| Charging outlet | Equivalent resistance of R4' | R4' | Ω | 1000 |
| To-be-charged vehicle 300 | Equivalent resistance of R1' | R1' | Ω | 1000 |
| | Equivalent resistance of R6' | R6' | Ω | 1000 |
| | Fourth pull-up voltage | U | V | 5 |
| | Voltage of fourth detection point b' | U2a | V | 5 |
| | | U2b | V | 2.5 |

TABLE 7

| Status | R3 | R2 | S | U1 | Interface connection status and rated current |
|---|---|---|---|---|---|
| State A | — | | — | 2.5 V | The vehicle interface is not completely connected |
| State B | — | | Open | 2.5 V | The mechanical locking device is unlocked |
| State C | 750 Ω/0.5 W$^a$ | — | Close | 1.5 V | The vehicle interface is completely connected, and the capacity of the charging cable is 80 A |
| State C' | 750 Ω/0.5 W$^a$ | 1.2 KΩ/0.5 W$^b$ | Open | 2 V | The vehicle interface is in a half-connected state |
| State D | 330 Ω/0.5 W$^a$ | — | Close | 1.0 V | The vehicle interface is completely connected, and the capacity of the charging cable is 125 A |
| State D' | 330 Ω/0.5 W$^a$ | 1.6 KΩ/0.5 W$^b$ | Open | 2 V | The vehicle interface is in a half-connected state |
| State E | 120 Ω/0.5 W$^a$ | — | Close | 0.5 V | The vehicle interface is completely connected, and the capacity of the charging cable is 200 A |
| State E' | 120 Ω/0.5 W$^a$ | 1.8 KQ/0.5 W$^b$ | Open | 2 V | The vehicle interface is in a half-connected state |

A timing diagram and a timing table corresponding to the data in Table 4 and Table 6 are similar to that of the data in Table 1. Only the voltage value of the first detection point a of the discharging vehicle 200 in the timing diagram is required to be modified to a corresponding value, and the voltages of the first detection point a in the T0→T2 row and the T19→T21 row of the timing table are required to be modified to corresponding values.

Advantages and disadvantages of the three sets of data are as follows: In Table 4, the requirements on a precision of a device required for detecting the voltage of the first detection point a are the lowest, but power consumption of the resistor R1 is high. Power consumption of the resistors in Table 1 and Table 6 is very small, but a rated current of a connecting device corresponding to Table 6 has only three gears. Comprehensively, the data in Table 1 is the optimal.

In conclusion, the cable assembly in this embodiment of the present disclosure is a movable connection device, which can realize the confirmation of the V2V DC charging connection and the determination of the rated current parameter of the cable, thereby ensuring the safety and the reliability of the V2V DC charging.

Figure 6:
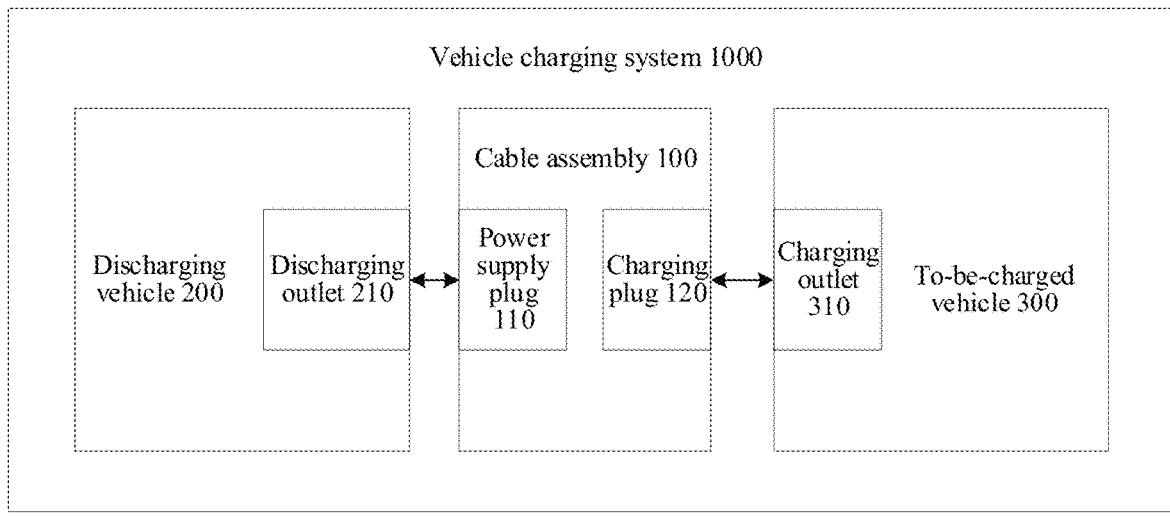
FIG. 6 is a structural block diagram of a vehicle charging system according to an embodiment of the present disclosure.

FIG. 6 is a structural block diagram of a vehicle charging system according to an embodiment of the present disclosure.

As shown in FIG. 6, the vehicle charging system 1000 includes a discharging vehicle 200, a to-be-charged vehicle 300, and the cable assembly 100 in the above embodiment.

Specifically, a discharging outlet 210 is disposed on the discharging vehicle 200, and a charging outlet 310 is disposed on the to-be-charged vehicle 300. When the discharging vehicle 200 charges the to-be-charged vehicle 300, the discharging outlet 210 is adaptively connected to the power supply plug 110, and the charging outlet 310 is adaptively connected to the charging plug 120.

In this embodiment, the discharging outlet 210 and the charging outlet 310 each includes 9 jacks: a DC+ jack, a DC− jack, a PE jack, a CANH jack, a CANL jack, an A+ jack, an A− jack, a CC1 jack, and a CC2 jack.

In an embodiment, as shown in FIG. 3, when the power supply plug 110 and the charging plug 120 each include 8 pins, the DC+ jack, the DC− jack, the PE jack, the CANH jack, the CANL jack, the A+ jack, the A− jack, and the CC1 jack of the discharging outlet 210 are respectively and correspondingly connected to the DC+ pin, the DC− plug, the PE pin, the CANH pin, the CANL pin, the A+ pin, the A− pin, and the CC1 pin of the power supply plug 110, and the CC2 jack of the discharging outlet 210 is idle. The DC+ jack, the DC− jack, the PE jack, the CANH jack, the CANL jack, the A+ jack, the A− jack, and the CC2 jack of the charging outlet 310 are respectively and correspondingly connected to the DC+ pin, the DC− plug, the PE pin, the CANH pin, the CANL pin, the A+ pin, the A− pin, and the CC2 pin of the charging plug 120, and the CC1 jack of the charging outlet 310 is idle.

In another embodiment, as shown in FIG. 4, when the power supply plug 110 and the charging plug 120 each include 9 pins, the DC+ jack, the DC− jack, the PE jack, the CANH jack, the CANL jack, the A+ jack, the A− jack, the CC1 jack, and the CC2 jack of the discharging outlet 210 are respectively and correspondingly connected to the DC+ pin, the DC− pin, the PE pin, the CANH pin, the CANL pin, the A+ pin, the A− pin, the CC1 pin, and the CC2 pin of the power supply plug 110. The DC+ jack, the DC− jack, the PE jack, the CANH jack, the CANL jack, the A+ jack, the A− jack, the CC1 jack, and the CC2 jack of the charging outlet 310 are respectively and correspondingly connected to the DC+ pin, the DC− pin, the PE pin, the CANH pin, the CANL pin, the A+ pin, the A− pin, the CC1 pin, and the CC2 pin of the charging plug 120.

In this embodiment of the present disclosure, as shown in FIG. 3 and FIG. 4, the discharging outlet 210 includes a resistor R4. One end of the resistor R4 is connected to the PE jack of the discharging outlet 210, and another end of the resistor R4 is connected to the CC1 jack of the discharging outlet. The discharging vehicle 200 includes a power supply device 230, a discharging control device 220, an auxiliary power supply 240, a resistor R1, a resistor R6, a switch K1, a switch K2, a switch K3, a switch K4, and a first body ground GND1. A first electrode of the power supply device 230 is connected to the DC+ jack of the discharging outlet 210 by the switch K1. A second electrode of the power supply device 230 is connected to the DC− jack of the discharging outlet 210 by the switch K2. The first body ground GND1 is connected to the PE jack of the discharging outlet 210. The discharging control device 220 is connected to the CANH jack and the CANL jack of the discharging outlet 210 to transmit charging and discharging data. A first electrode of the auxiliary power supply 240 is connected to the A+ jack of the discharging outlet 210 by the switch K3. A second electrode of the auxiliary power supply 240 is connected to the A− jack of the discharging outlet 210 by the switch K4. One end of the resistor R1 is connected to the CC1 jack of the discharging outlet 210 to form a first detection point a. Another end of the resistor R1 is connected to a first pull-up voltage U1. One end of the resistor R6 is connected to the CC2 jack of the discharging outlet 210 to form a second detection point b. Another end of the resistor R6 is connected to a second pull-up voltage U2.

As shown in FIG. 3 and FIG. 4, the charging outlet 310 includes a resistor R4'. One end of the resistor R4' is connected to the PE jack of the charging outlet 310, and another end of the resistor R4' is connected to the CC1 jack of the charging outlet 310. The to-be-charged vehicle 300 includes a battery pack 330, a charging control device 320, a resistor R1', a resistor R6', a switch K5, a switch K6, and a second body ground GND2. A first electrode of the battery pack 330 is connected to the DC+ jack of the charging outlet 310 by the switch K5. A second electrode of the battery pack 330 is connected to the DC− jack of the charging outlet by the switch K6. The second body ground GND2 is connected to the PE jack of the charging outlet 310. The charging control device 320 is connected to the CANH jack and the CANL jack of the charging outlet 310 to transmit charging and discharging data. A positive power supply terminal of the charging control device 320 is connected to the A+ jack of the charging outlet 310. A negative power supply terminal of the charging control device 320 is connected to the A− jack of the charging outlet 310. One end of the resistor R1' is connected to the CC1 jack of the charging outlet 310 to form a third detection point a'. Another end of the resistor R1' is connected to a third pull-up voltage U1'. One end of the resistor R6' is connected to the CC2 jack of the charging outlet 310 to form a fourth detection point b'. Another end of the resistor R6' is connected to a fourth pull-up voltage U2'.

The discharging control device 220 is configured to determine that the power supply plug 110 is electrically connected to the discharging outlet 210 when a decrease value of a voltage of the first detection point a is greater than a first preset value. The charging control device 320 is configured to determine that the charging plug 120 is electrically connected to the charging outlet 310 when a decrease value of a voltage of the fourth detection point b' is greater than a second preset value.

In this embodiment of the present disclosure, the discharging control device 220 is further configured to acquire a rated current of the cable 130 to perform discharging control on the power supply device 230 according to the rated current.

It should be noted that, for other specific implementations of the vehicle charging system in this embodiment of the present disclosure, refer to the foregoing descriptions of the specific implementations of the cable assembly.

The vehicle charging system in this embodiment of the present disclosure can realize, by using the movable cable assembly, the confirmation of V2V DC charging connection and the determination of the rated current of the cable, so that the safety and the reliability of the V2V DC charging can be ensured. The charging manner is more convenient and can meet the charging requirements of vehicles.

In the description of this specification, the description of the reference terms such as "an embodiment", "some embodiments", "exemplary embodiments", "example", "specific example", or "some examples" means that the specific features, structures, materials or characteristics described with reference to the embodiment or example are included in at least one embodiment or example of the present disclosure. In this specification, schematic descriptions of the foregoing terms do not necessarily point at a same embodiment or example. In addition, the described specific features, structures, materials, or characteristics may be combined in a proper manner in any one or more of the embodiments or examples.

In the description of the present disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anti-clockwise", "axial", "radial", and "circumferential" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure.

In addition, the terms "first" and "second" are used for descriptive purposes only and are not to be construed as indicating or implying relative importance or implicitly indicating the number of technical features indicated. Therefore, features defining "first" and "second" can explicitly or implicitly include at least one of the features. In the descriptions of the present disclosure, unless explicitly specified, "multiple" means at least two, for example, two or three.

In the present disclosure, it should be noted that unless otherwise explicitly specified and limited, the terms "mount", "connect", "connection", and "fix" should be understood in a broad sense. For example, a connection may be a fixed connection, a detachable connection, or an integral connection; or the connection may be a mechanical connection or an electrical connection; or the connection may be a direct connection, an indirect connection through an intermediary, or internal communication between two elements or mutual action relationship between two elements, unless otherwise specified explicitly. Unless otherwise explicitly specified or define, a person of ordinary skill in the art can understand specific meanings of the terms in the present disclosure based on specific situations.

In the present disclosure, unless expressly stated and defined otherwise, a first feature "on" or "beneath" a second feature may be that the first and second features are in direct contact, or that the first and second features are in indirect contact via an intermediary. Moreover, the first feature "over", "above" and "up" the second feature may be that the first feature is directly above or obliquely above the second feature, or simply indicates that a horizontal height of the first feature is higher than that of the second feature. The first feature "under", "below" and "down" the second feature may be that the first feature is directly below or obliquely below the second feature, or simply indicates that a horizontal height of the first feature is less than that of the second feature.

While the embodiments of the present disclosure have been shown and described above, it is to be understood that the above-described embodiments are illustrative and not to be construed as limiting the present disclosure, and changes, modifications, substitutions, and variations of the above-described embodiments may occur to those of ordinary skill in the art within the scope of the disclosure.

What is claimed is:

1. A cable assembly, comprising:
a power supply plug, adapted to a discharging outlet of a discharging vehicle;
a charging plug, adapted to a charging outlet of a to-be-charged vehicle; and
a cable, connected between the power supply plug and the charging plug,
wherein the power supply plug comprises a resistor R2, a resistor R3, and a switch S, one end of the resistor R3 is connected directly to a PE pin of the power supply plug, another end of the resistor R3 is connected to one end of the resistor R2, another end of the resistor R2 is connected directly to a CC1 pin of the power supply plug, and the switch S is connected in parallel to the resistor R2.

2. The cable assembly according to claim 1, wherein the cable comprises a connecting harness, and the connecting harness comprises a DC+ line, a DC− line, a PE line, a CANH line, a CANL line, an A+ line, and an A− line.

3. The cable assembly according to claim 2, wherein
each of the power supply plug and the charging plug comprises 8 pins,
the power supply plug comprises a DC+ pin, a DC− pin, the PE pin, a CANH pin, a CANL pin, an A+ pin, an A− pin, and the CC1 pin, and
the charging plug comprises a DC+ pin, a DC− pin, a PE pin, a CANH pin, a CANL pin, an A+ pin, an A− pin, and a CC2 pin,
wherein the DC+ pin, the DC− pin, the PE pin, the CANH pin, the CANL pin, the A+ pin, and the A− pin of each of the power supply plug and the charging plug are respectively and correspondingly connected to the DC+ line, the DC− line, the PE line, the CANH line, the CANL line, the A+ line, and the A− line.

4. The cable assembly according to claim 1, wherein the charging plug comprises a resistor R5', one end of the resistor R5' is connected directly to the PE pin of the charging plug, and another end of the resistor R5' is connected directly to a CC2 pin of the charging plug.

5. The cable assembly according to claim 4, wherein a power supply identifier is disposed on the power supply plug, and/or a charging identifier is disposed on the charging plug.

6. The cable assembly according to claim 2,
wherein the power supply plug and the charging plug have a same structure, and each of the power supply plug and the charging plug comprises 9 pins including: a DC+ pin, a DC− pin, the PE pin, a CANH pin, a CANL pin, an A+ pin, an A− pin, the CC1 pin, and a CC2 pin, and
wherein the DC+ pin, the DC− pin, the PE pin, the CANH pin, the CANL pin, the A+ pin, and the A− pin are respectively and correspondingly connected to the DC+ line, the DC− line, the PE line, the CANH line, the CANL line, the A+ line, and the A− line.

7. A cable assembly according to claim 6, comprising:
a power supply plug, adapted to a discharging outlet of a discharging vehicle;
a charging plug, adapted to a charging outlet of a to-be-charged vehicle; and
a cable, connected between the power supply plug and the charging plug,
wherein the power supply plug comprises a resistor R2, a resistor R3, a switch S, and a resistor R5, one end of the resistor R3 is connected directly to a PE pin of the power supply plug, another end of the resistor R3 is connected to one end of the resistor R2, another end of the resistor R2 is connected directly to a CC1 pin of the power supply plug, the switch S is connected in parallel to the resistor R2, one end of the resistor R5 is connected directly to the PE pin of the power supply plug, and another end of the resistor R5 is connected directly to a CC2 pin of the power supply plug.

8. The cable assembly according to claim 7, wherein the charging plug comprises a resistor R2', a resistor R3', a switch S', and a resistor R5', one end of the resistor R3' is connected directly to a PE pin of the charging plug, another end of the resistor R3' is connected to one end of the resistor R2', another end of the resistor R2' is connected directly to a CC1 pin of the charging plug, the switch S' is connected in parallel to the resistor R2', one end of the resistor R5' is connected directly to the PE pin of the charging plug, and another end of the resistor R5' is connected directly to a CC2 pin of the charging plug.

9. A vehicle charging system, comprising:
a cable assembly comprising a power supply plug, a charging plug, and a cable connected between the power supply plug and the charging plug;
a discharging vehicle comprising a discharging outlet; and
a to-be-charged vehicle comprising a charging outlet;
wherein when the discharging vehicle charges the to-be-charged vehicle, the discharging outlet is adaptively connected to the power supply plug, and the charging outlet is adaptively connected to the charging plug; and
wherein the power supply plug comprises a resistor R2, a resistor R3, and a switch S, one end of the resistor R3 is connected directly to a PE pin of the power supply plug, another end of the resistor R3 is connected to one end of the resistor R2, another end of the resistor R2 is connected directly to a CC1 pin of the power supply plug, and the switch S is connected in parallel to the resistor R2.

10. The vehicle charging system according to claim 9,
wherein each of the discharging outlet and the charging outlet comprises a DC+ jack, a DC− jack, a PE jack, a CANH jack, a CANL jack, an A+ jack, an A− jack, a CC1 jack, and a CC2 jack, and
wherein:
each of the power supply plug and the charging plug comprises 8 pins;
the DC+ jack, the DC− jack, the PE jack, the CANH jack, the CANL jack, the A+ jack, the A− jack, and the CC1 jack of the discharging outlet are respectively and correspondingly connected to a DC+ pin, a DC− pin, the PE pin, a CANH pin, a CANL pin, an A+ pin, an A− pin, and the CC1 pin of the power supply plug;
the CC2 jack of the discharging outlet is idle;
the DC+ jack, the DC− jack, the PE jack, the CANH jack, the CANL jack, the A+ jack, the A− jack, and the CC2 jack of the charging outlet are respectively and correspondingly connected to a DC+ pin, a DC-Pin, a PE pin, a CANH pin, a CANL pin, an A+ pin, an A− pin, and a CC2 pin of the charging plug; and
a CC1 jack of the charging outlet is idle.

11. The vehicle charging system according to claim 10,
wherein the discharging outlet further comprises a resistor R4, one end of the resistor R4 is connected directly to the PE jack of the discharging outlet, another end of the resistor R4 is connected directly to the CC1 jack of the discharging outlet, and the discharging vehicle comprises a power supply device, a discharging control device, a resistor R1, a resistor R6, a switch K1, a switch K2, a switch K3, a switch K4, and a first body ground, wherein a first electrode of the power supply device is connected to the DC+ jack of the discharging outlet by the switch K1, a second electrode of the power supply device is connected to the DC− jack of the discharging outlet by the switch K2, the first body ground is connected to the PE jack of the discharging outlet, the discharging control device is connected to the CANH jack and the CANL jack of the discharging outlet to transmit charging and discharging data, a first electrode of an auxiliary power supply in the discharging control device is connected to the A+ jack of the discharging outlet by the switch K3, a second electrode of the auxiliary power supply is connected to the A− jack of the discharging outlet by the switch K4, one end of the resistor R1 is connected directly to the CC1 jack of the discharging outlet to form a first detection point, another end of the resistor R1 is connected to a first pull-up voltage, one end of the resistor R6 is connected directly to the CC2 jack of the discharging outlet to form a second detection point, and another end of the resistor R6 is connected to a second pull-up voltage, wherein the charging outlet further comprises a resistor R4′, one end of the resistor R4′ is connected directly to the PE jack of the charging outlet, another end of the resistor R4′ is connected directly to the CC1 jack of the charging outlet, and the to-be-charged vehicle comprises a battery pack, a charging control device, a resistor R1′, a resistor R6′, a switch K5, a switch K6, and a second body ground, and wherein a first electrode of the battery pack is connected to the DC+ jack of the charging outlet by the switch K5, a second electrode of the battery pack is connected to the DC− jack of the charging outlet by the switch K6, the second body ground is connected to the PE jack of the charging outlet, the charging control device is connected to the CANH jack and the CANL jack of the charging outlet to transmit charging and discharging data, a positive power supply terminal of the charging control device is connected to the A+ jack of the charging outlet, a negative power supply terminal of the charging control device is connected to the A− jack of the charging outlet, one end of the resistor R1′ is connected directly to the CC1 jack of the charging outlet to form a third detection point, another end of the resistor R1′ is connected to a third pull-up voltage, one end of the resistor R6′ is connected directly to the CC2 jack of the charging outlet to form a fourth detection point, and another end of the resistor R6′ is connected to a fourth pull-up voltage.

12. The vehicle charging system according to claim 11, wherein
the discharging control device is configured to determine that the power supply plug is electrically connected to the discharging outlet when a decrease value of a voltage of the first detection point is greater than a first preset value; and
the charging control device is configured to determine that the charging plug is electrically connected to the charging outlet when a decrease value of a voltage of the fourth detection point is greater than a second preset value.

13. The vehicle charging system according to claim 11, wherein the discharging control device is further configured to:

acquire a rated current of the cable to perform discharging control on the power supply device according to the rated current.

14. The vehicle charging system according to claim 9, wherein the cable comprises a connecting harness, and the connecting harness comprises a DC+ line, a DC− line, a PE line, a CANH line, a CANL line, an A+ line, and an A− line.

15. The vehicle charging system according to claim 9,
wherein each of the discharging outlet and the charging outlet comprises a DC+ jack, a DC− jack, a PE jack, a CANH jack, a CANL jack, an A+ jack, an A− jack, a CC1 jack, and a CC2 jack, and
wherein:
each of the power supply plug and the charging plug comprises 9 pins;
the DC+ jack, the DC− jack, the PE jack, the CANH jack, the CANL jack, the A+ jack, the A− jack, the CC1 jack, and the CC2 jack of the discharging outlet are respectively and correspondingly connected to a DC+ pin, a DC− pin, the PE pin, a CANH pin, a CANL pin, an A+ pin, an A− pin, the CC1 pin, and a CC2 pin of the power supply plug; and
the DC+ jack, the DC− jack, the PE jack, the CANH jack, the CANL jack, the A+ jack, the A− jack, the CC1 jack, and the CC2 jack of the charging outlet are respectively and correspondingly connected to a DC+ Pin, a DC− pin, a PE pin, a CANH pin, a CANL pin, an A+ pin, an A− pin, a CC1 pin, and a CC2 pin of the charging plug.

16. The vehicle charging system according to claim 15,
wherein the discharging outlet further comprises a resistor R4, one end of the resistor R4 is connected directly to the PE jack of the discharging outlet, another end of the resistor R4 is connected directly to the CC1 jack of the discharging outlet, and the discharging vehicle comprises a power supply device, a discharging control device, a resistor R1, a resistor R6, a switch K1, a switch K2, a switch K3, a switch K4, and a first body ground, wherein a first electrode of the power supply device is connected to the DC+ jack of the discharging outlet by the switch K1, a second electrode of the power supply device is connected to the DC− jack of the discharging outlet by the switch K2, the first body ground is connected to the PE jack of the discharging outlet, the discharging control device is connected to the CANH jack and the CANL jack of the discharging outlet to transmit charging and discharging data, a first electrode of an auxiliary power supply in the discharging control device is connected to the A+ jack of the discharging outlet by the switch K3, a second electrode of the auxiliary power supply is connected to the A− jack of the discharging outlet by the switch K4, one end of the resistor R1 is connected directly to the CC1 jack of the discharging outlet to form a first detection point, another end of the resistor R1 is connected to a first pull-up voltage, one end of the resistor R6 is connected directly to the CC2 jack of the discharging outlet to form a second detection point, and another end of the resistor R6 is connected to a second pull-up voltage, wherein the charging outlet further comprises a resistor R4′, one end of the resistor R4′ is connected directly to the PE jack of the charging outlet, another end of the resistor R4′ is connected directly to the CC1 jack of the charging outlet, and the to-be-charged vehicle comprises a battery pack, a charging control device, a resistor R1′, a resistor R6′, a switch K5, a switch K6, and a second body ground, and wherein a first electrode of the battery pack is connected to the DC+ jack of the charging outlet by the switch K5, a second electrode of the battery pack is connected to the DC− jack of the charging outlet by the switch K6, the second body ground is connected to the PE jack of the charging outlet, the charging control device is connected to the CANH jack and the CANL jack of the charging outlet to transmit charging and discharging data, a positive power supply terminal of the charging control device is connected to the A+ jack of the charging outlet, a negative power supply terminal of the charging control device is connected to the A− jack of the charging outlet, one end of the resistor R1' is connected directly to the CC1 jack of the charging outlet to form a third detection point, another end of the resistor R1' is connected to a third pull-up voltage, one end of the resistor R6' is connected directly to the CC2 jack of the charging outlet to form a fourth detection point, and another end of the resistor R6' is connected to a fourth pull-up voltage.

17. The vehicle charging system according to claim 16, wherein
the discharging control device is configured to determine that the power supply plug is electrically connected to the discharging outlet when a decrease value of a voltage of the first detection point is greater than a first preset value; and
the charging control device is configured to determine that the charging plug is electrically connected to the charging outlet when a decrease value of a voltage of the fourth detection point is greater than a second preset value.

18. The vehicle charging system according to claim 16, wherein the discharging control device is further configured to:
acquire a rated current of the cable to perform discharging control on the power supply device according to the rated current.

\* \* \* \* \*